US006215999B1

United States Patent
Dorenbosch

(10) Patent No.: US 6,215,999 B1
(45) Date of Patent: Apr. 10, 2001

(54) METHOD AND APPARATUS FOR IDENTIFYING CHANNELS AND CHANNEL FREQUENCIES USED IN A SUBZONE OF A WIRELESS COMMUNICATION SYSTEM

(75) Inventor: Jheroen Pieter Dorenbosch, Paradise, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/271,931

(22) Filed: Mar. 17, 1999

(51) Int. Cl.$^7$ ....................................... H04Q 7/20
(52) U.S. Cl. ........................ 455/434; 455/511; 455/516
(58) Field of Search ................................. 455/434, 436, 455/447, 450, 451, 452, 455, 509, 515, 516, 511; 370/328, 329, 330

(56) References Cited

U.S. PATENT DOCUMENTS

| | | | |
|---|---|---|---|
| 4,583,218 | * | 4/1986 | Ardon et al. ............................ 370/376 |
| 5,325,088 | * | 6/1994 | Willard et al. ........................ 340/825.2 |
| 5,392,287 | * | 2/1995 | Tiedemann, Jr. et al. ............ 370/311 |
| 5,537,398 | * | 7/1996 | Siwiak ................................... 370/204 |
| 5,682,147 | * | 10/1997 | Eaton et al. ...................... 340/825.03 |
| 5,710,766 | * | 1/1998 | Schwendeman ...................... 370/329 |
| 5,732,076 | * | 3/1998 | Ketseoglou et al. ................. 370/347 |
| 5,875,387 | * | 2/1999 | Ayerst .................................. 455/31.3 |
| 5,878,035 | * | 3/1999 | Wang et al. .......................... 370/329 |
| 5,923,266 | * | 7/1999 | Wang et al. ...................... 340/825.44 |
| 5,943,325 | * | 8/1999 | Hadar et al. .......................... 370/324 |

* cited by examiner

Primary Examiner—Dwayne Bost
Assistant Examiner—Jean A Gelin
(74) Attorney, Agent, or Firm—R. Louis Breeden

(57) ABSTRACT

A controller (112) performs at least one of (a) alternating (700) first and second SCI frames in a subzone, and (b) identifying (800) private data channels. In alternating the first and second SCI frames, the controller transmits (704), in the first SCI frame, on a plurality of frequencies, a first predetermined number of control channel identifiers and corresponding frequency identifiers; and sends (706), in the second SCI frame, on the plurality of frequencies, a second predetermined number of control channel identifiers and corresponding frequency identifiers, the first and second predetermined numbers different from one another. In identifying private data channels, the controller conveys (804), in the subzone in an SCI frame on ones of a plurality of control channels, a channel identifier and frequency of at least one data-only channel corresponding to the ones of the plurality of control channels. At least some data-only channels corresponding to different control channels occupy different frequencies.

20 Claims, 5 Drawing Sheets

METHOD AND APPARATUS FOR IDENTIFYING CHANNELS AND CHANNEL FREQUENCIES USED IN A SUBZONE OF A WIRELESS COMMUNICATION SYSTEM

FIELD OF THE INVENTION

This invention relates in general to wireless communication systems, and more specifically to a method and apparatus for identifying channels and channel frequencies used in a subzone of a wireless communication system.

BACKGROUND OF THE INVENTION

Wireless communication systems are becoming increasingly popular, demanding increasing numbers of channels to carry the communication traffic. Some modem wireless massaging systems have utilized system configuration information (SCI) frames on one or more control channels to identify the totality of control channels, non-control channels (data-only channels), and corresponding frequencies used by the channels throughout a subzone. In a FLEX® two-way messaging system, for example, a subzone is the smallest area in the messaging system in which control information is simulcast. An invariant group of control channels and data channels are used throughout the subzone.

With the growth of wireless messaging, some systems are starting to need more channels per subzone than was anticipated a few years ago when the communication protocols were designed. The SCI frames of the FLEX® two-way messaging protocol, for example, can identify up to eight channels. Some service providers now anticipate a requirement for more than eight channels per subzone.

Thus, what is needed is a method and apparatus for enabling an identification of more than the maximum number of channel frequencies per subzone possible in prior art systems. Preferably, the method and apparatus will be backward compatible without requiring any changes in subscriber units already operating in the wireless communication systems.

SUMMARY OF THE INVENTION

An aspect of the present invention is a method in a wireless communication system that transmits a system configuration information (SCI) frame on a control channel to identify up to a maximum number of channel frequencies employed within a subzone of the wireless communication system. The method enables an identification of more than the maximum number of channel frequencies in the subzone. The method comprises at least one of the steps of (a) alternating first and second SCI frames in the subzone, and (b) identifying private data channels. The step of alternating first and second SCI frames includes transmitting, in the first SCI frame, on a plurality of frequencies, a first predetermined number of control channel identifiers and corresponding frequency identifiers; and sending, in the second SCI frame, on the plurality of frequencies, a second predetermined number of control channel identifiers and corresponding frequency identifiers, the first and second predetermined numbers different from one another. The transmitting and sending steps are repeated alternately. The step of identifying private data channels includes conveying, in the subzone in an SCI frame on ones of a plurality of control channels, a channel identifier and frequency of at least one data-only channel corresponding to the ones of the plurality of control channels, wherein at least some data-only channels corresponding to different control channels occupy different frequencies.

Another aspect of the present invention is a controller in a wireless communication system that transmits a system configuration information (SCI) frame on a control channel to identify up to a maximum number of channels employed within a subzone of the wireless communication system. The controller enables an identification of more than the maximum number of channels in the subzone. The controller comprises a network interface for receiving messages, a processing system coupled to the network interface for processing the messages, and a base station interface coupled to the processing system for controlling a transmitter to send the messages. The processing system is programmed to do at least one of (a) alternating first and second SCI frames in the subzone, and (b) identifying private data channels. In alternating the first and second SCI frames in the subzone, the processing system is programmed to transmit, in the first SCI frame, on a plurality of frequencies, a first predetermined number of control channel identifiers and corresponding frequency identifiers; and to send, in the second SCI frame, on the plurality of frequencies, a second predetermined number of control channel identifiers and corresponding frequency identifiers, the first and second predetermined numbers different from one another. The processing system is further programmed to repeat the transmission of the first and second SCI frames alternately. In identifying private data channels, the processing system is programmed to convey, in the subzone in an SCI frame on ones of a plurality of control channels, a channel identifier and frequency of at least one data-only channel corresponding to the ones of the plurality of control channels, wherein at least some data-only channels corresponding to different control channels occupy different frequencies.

DETAILED DESCRIPTION OF THE DRAWINGS

Figure 1:
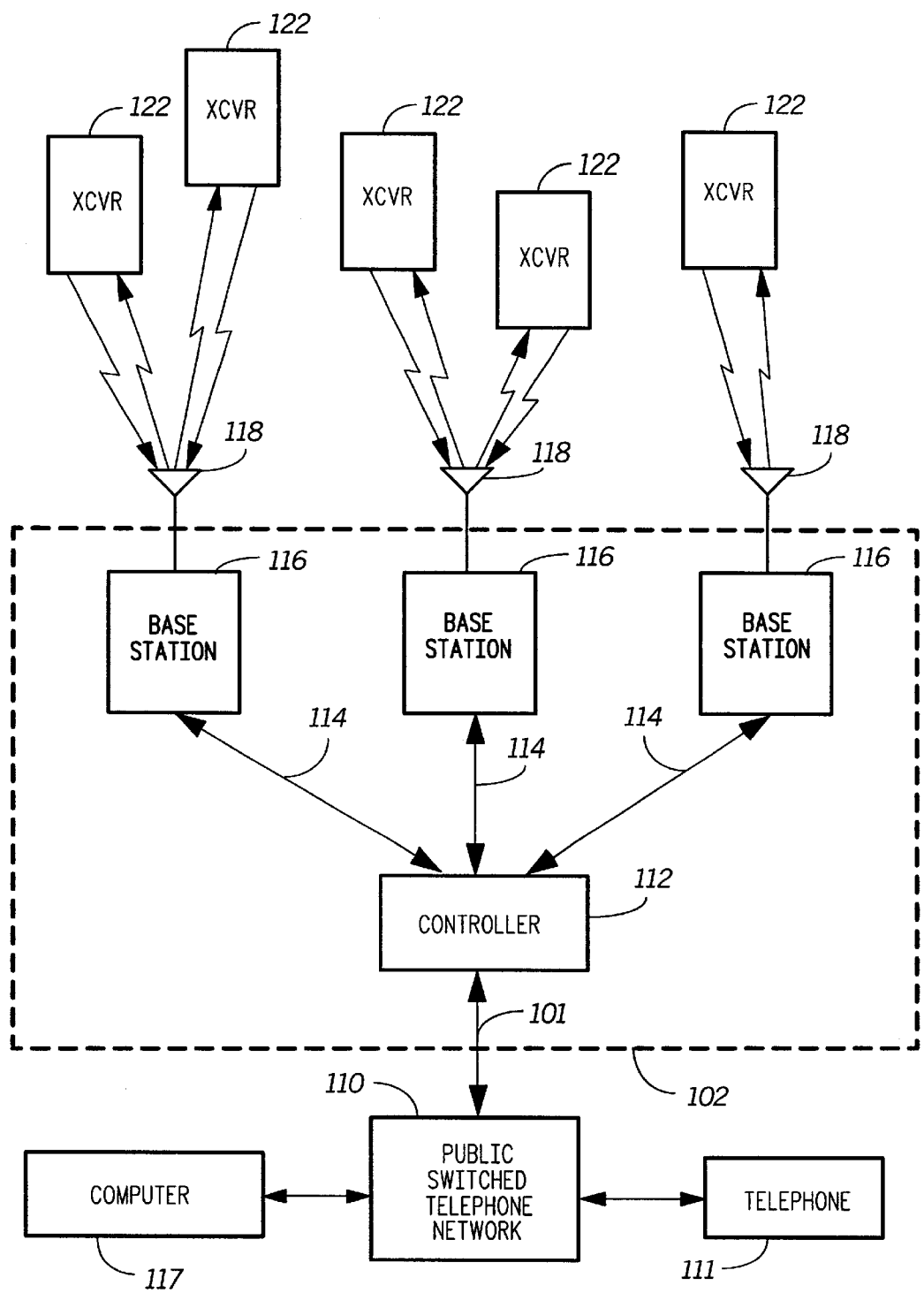
FIG. 1 is an electrical block diagram of an exemplary wireless communication system in accordance with the present invention.

Referring to FIG. 1, an electrical block diagram depicts an exemplary wireless communication system in accordance with the present invention, comprising an infrastructure portion 102 including a controller 112 and a plurality of conventional base stations 116, the communication system also including a plurality of transceivers 122. The base stations 116 preferably communicate with the transceivers 122 utilizing conventional radio frequency (RF) techniques, and are coupled by conventional communication links 114 to the controller 112, which controls the base stations 116.

The hardware of the controller 112 is preferably a combination of a Choreographer!® network management device, a Wireless Messaging Gateway (WMG™) Administrator!™ terminal, an RF-Usher!™ multiplexer, and an RF-Conductor!® message distributor manufactured by Motorola, Inc., and utilizes software modified in accordance with the present invention. The hardware of the base stations 116 is preferably a combination of the RF-Orchestra!® transmitter and the RF-Audience!® receiver manufactured by Motorola, Inc. The transceivers 122 are preferably similar to PageWriter® 2000 data transceivers, also manufactured by Motorola, Inc. It will be appreciated that other similar hardware can be used as well for the controller 112, the base stations 116, and the transceivers 122. It will be further appreciated that the present invention works for one-way messaging units, as well.

Each of the base stations 116 transmits RF signals to the transceivers 122 via an antenna 118. The base stations 116 preferably each receive RF signals from the plurality of transceivers 122 via the antenna 118. The RF signals transmitted by the base stations 116 to the transceivers 122 (outbound messages) comprise selective call addresses identifying the transceivers 122, and data messages originated by a message originator, as well as commands originated by the controller 112 for adjusting operating parameters of the radio communication system. The RF signals preferably transmitted by the transceivers 122 to the base stations 116 (inbound messages) comprise responses that include scheduled messages, such as positive acknowledgments (ACKs) and negative acknowledgments (NAKs), and unscheduled messages, such as registration requests and requests for items of information. For frequency reuse, the coverage area of the wireless communication system is preferably partitioned into zones and subzones, a subzone being the smallest area in which system configuration information (SCI) frames are simulcast. Thus, a subzone utilizes the same group of control channels and data-only channels throughout.

The controller 112 preferably is coupled by telephone links 101 to a public switched telephone network (PSTN) 110 for receiving selective call message originations therefrom. Selective call originations comprising data messages from the PSTN 110 can be generated, for example, from a conventional telephone 111 or a conventional computer 117 coupled to the PSTN 110. It will be appreciated that, alternatively, other types of networks, e.g., a local area network (LAN), a wide area network (WAN), and the Internet, to name a few, can be used for receiving selective call originations.

The over-the-air protocol utilized for outbound and inbound messages is preferably selected from Motorola's well-known FLEX™ family of digital selective call signaling protocols. These protocols utilize well-known error detection and error correction techniques and are therefore tolerant to bit errors occurring during transmission, provided that the bit errors are not too numerous. It will be appreciated that other suitable protocols can be used as well. While the preferred embodiment is a two-way wireless communication system, as depicted in FIG. 1, the present invention also is applicable to a one-way wireless communication system, as well.

Figure 2:
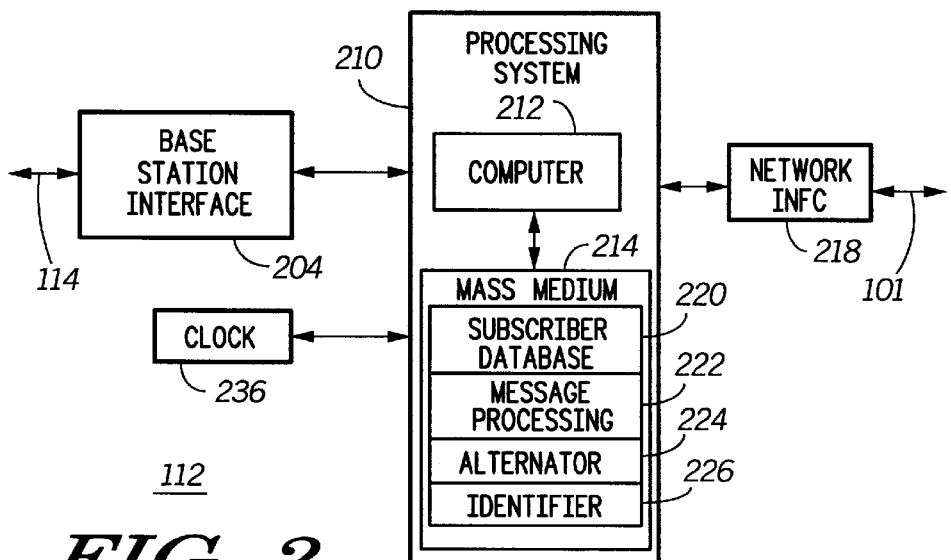
FIG. 2 is an electrical block diagram of an exemplary controller in accordance with the present invention.

FIG. 2 is an electrical block diagram depicting an exemplary controller 112 in accordance with the present invention. The controller 112 comprises a network interface 218 for receiving a message from a message originator via the telephone links 101. The network interface 218 is coupled to a processing system 210 for processing the message. The processing system 210 is coupled to a base station interface 204 for controlling and communicating with the base stations 116 via the communication links 114. The processing system 210 is also coupled to a conventional clock 236 for providing a timing signal to the processing system 210. The processing system 210 comprises a conventional computer 212 and a conventional mass medium 214, e.g., a magnetic disk drive, programmed with information and operating software in accordance with the present invention. The mass medium 214 preferably comprises a conventional subscriber database 220 for storing profiles defining service for subscribers using the system. The mass medium 214 further comprises a message processing program 222 for processing messages through well-known techniques.

The mass medium 214 also includes an alternator 224 for programming the processing system 210 to alternate first and second SCI frames in a subzone. This includes controlling at least one of the base stations 116 to transmit, in the first SCI frame, on a plurality of frequencies, a first predetermined number of control channel identifiers and corresponding frequency identifiers; and to send, in the second SCI frame, on the plurality of frequencies, a second predetermined number of control channel identifiers and corresponding frequency identifiers, the first and second predetermined numbers different from one another. The mass medium 214 further comprises an identifier 226 for programming the processing system 210 to identify private data channels by controlling at least one of the base stations 116 to convey in the subzone in an SCI frame on ones of a plurality of control channels, a channel identifier and frequency of at least one data-only channel corresponding to the ones of the plurality of control channels, wherein at least some data-only channels corresponding to different control channels occupy different frequencies. Operation of the controller 112 in accordance with the present invention is described further below.

To offer a concrete example, a wireless communication system utilizing the FLEX® two-way communication protocol will be used to explain the various aspects of the present invention. Prior art FLEX two-way systems can have up to 8 channels in a subzone. Each channel can be a control channel or a data-only channel. Addresses and vectors appear on control channels only; messages are transmitted on any channel. The control channels carry system configuration information (SCI) frames containing block information words (BIWs) that publish the channel layout to the transceivers 122. The transceivers 122 spread evenly over the control channels, based upon their addresses.

A transceiver 122 that comes into a system finds its control channel in the following way:
1. The transceiver 122 finds FLEX two-way activity on a frequency in its scan list (energy detection).
2. The transceiver 122 synchronizes and finds an SCI frame on the channel.
3. The transceiver 122 uses the service provider identifier (SPID) and zone BIWs to check whether this is an appropriate system for it to use.
4. If so, the transceiver 122 determines the number of control channels, computes the target control channel identifier, and moves to the corresponding channel.

5. The transceiver 122 waits for an SCI frame on the target channel and checks that the channel is the right one.
6. The transceiver 122 starts receiving messages.

A transceiver 122 calculates its target control channel as the transceiver's address, modulo (number of control channels). For example, if the transceiver's address is equal to 5, then when there are two control channels, the target channel identifier is 5 modulo 2, or channel 1. When there are 3 channels, the same transceiver 122 computes the target channel to be 5 modulo 3, or channel 2. It will be appreciated that the above description of how the transceiver 122 finds its control channel applies to one-way subscriber units as well.

The standard way to enhance system capacity is through reuse at the zone, subzone, and cellular level. Cellular reuse does not increase the total number of channels that are utilized; only the 8 channels published in the BIWs can be used for targeted FLEX two-way. The only simple way to increase the total number of channels in prior art systems is through the use of zones or subzones that each use a different set of control channel frequencies. The largest efficient system would use 3×8 control channels, which is still well below desired future expansion levels.

Two methods are described below for increasing the number of channels used in a subzone, in accordance with the present invention:
1. Alternating SCIs, and
2. Private Data Channels.

The first method can provide up to 840 channels in a FLEX two-way system, the second one only 20. Both methods advantageously are backwards compatible with today's FLEX two-way transceivers. The second method can be combined with subzoning to provide up to 60 channels. The two methods can be combined to obtain even larger capacities.

In the Alternating SCI method, to find the intended control channel, a transceiver 122 is stepped through different sets of control channels. To get an even distribution of transceivers 122 over the control channels, the numbers of control channels in each step preferably are relative primes. The ultimate number of control channels in a FLEX system then becomes 8×7×5×3=840.

Figure 3:
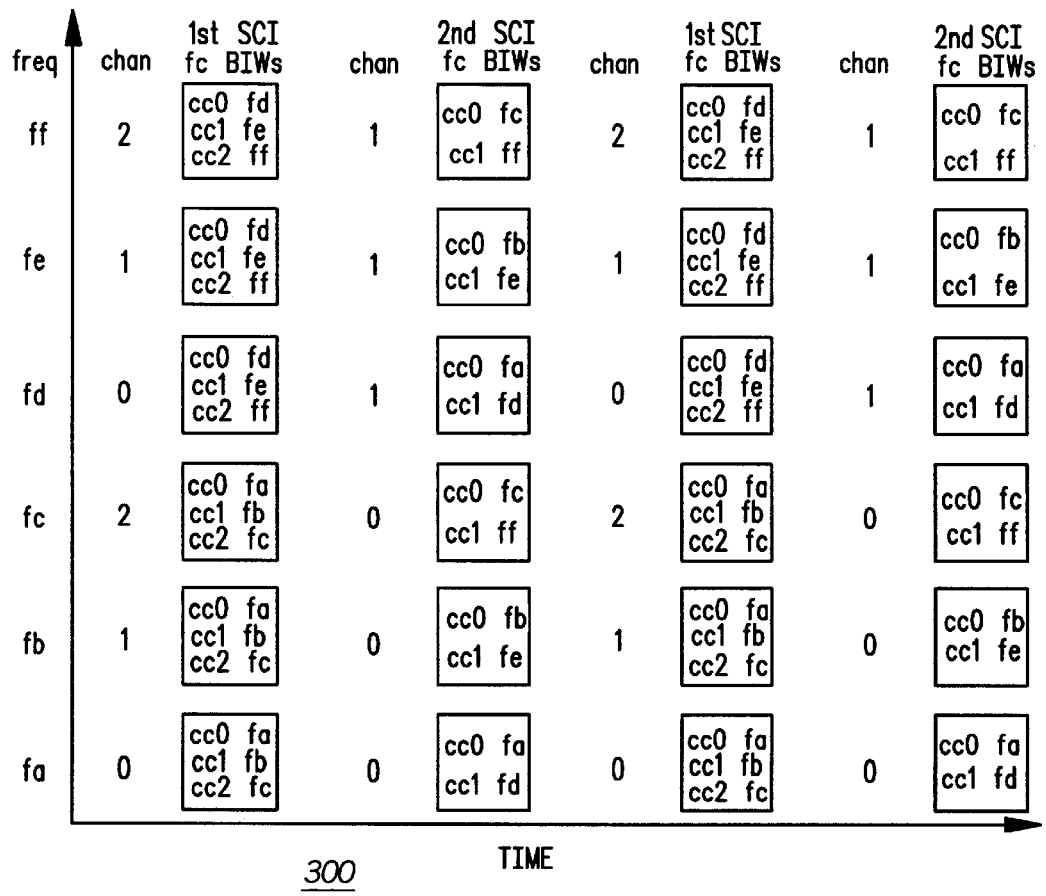
FIG. 3 is an exemplary time/frequency diagram depicting channel identification in accordance with the present invention.

In the Alternating SCI method the SCI information is dynamic—it changes periodically. FIG. 3 is an exemplary time/frequency diagram 300 depicting channel identification in accordance with the present invention. Forward channel BIWs are changed to drive a transceiver 122 to its intended control channel in a few steps. Once a transceiver 122 is on its target control channel, it will see the number of control channels vary periodically, but it always appear to be on the right one. Hence, message reception is not interrupted. Each frequency carrying control channel information alternates the information in its SCI frame to publish 3 and then 2 control channels to coordinate 3×2 control channel frequencies in a subzone. After initial energy detection, a transceiver 122 uses the SCI frame information to determine its control channel and frequency. In this example, there are six frequencies "fa" through "ff". In a first SCI frame, the frequencies fa, fb, and fc each publish three control channels, channels 0, 1, and 2, operating, respectively, on frequencies fa, fb, and fc. The frequencies fd, fe, and ff each publish three control channels, channels 0, 1, and 2, operating, respectively, on frequencies fd, fe, and ff. In a second SCI frame, the frequencies fa and fd each publish two control channels, channels 0 and 1, operating, respectively, on frequencies fa and fd. The frequencies fb and fe each publish two control channels, channels 0 and 1, operating, respectively, on frequencies fb and fe. The frequencies fc and ff each publish two control channels, channels 0 and 1, operating, respectively, on frequencies fc and ff. The first and second SCI frames are transmitted alternately. For example, the first SCI frame can be transmitted in odd numbered cycles of the protocol, while the second SCI frame is transmitted in even cycles.

Figure 4:
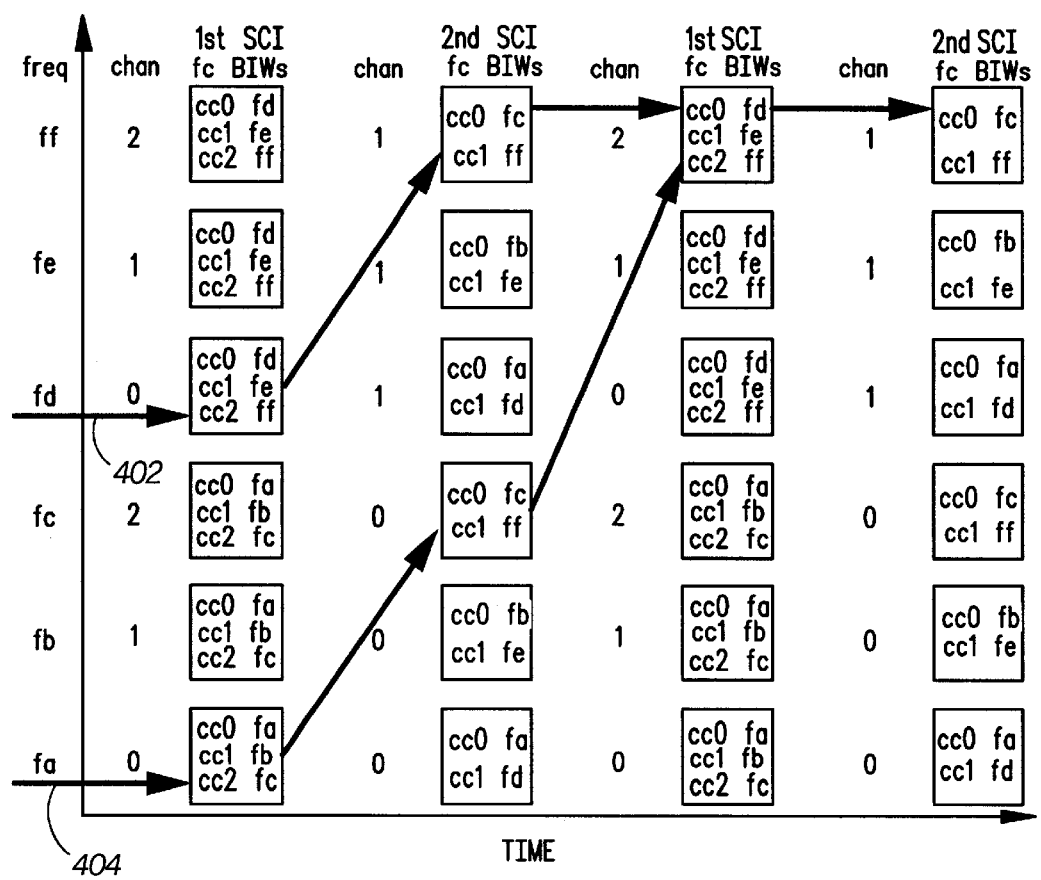
FIG. 4 is the exemplary time/frequency diagram depicting two of six possible paths which could be taken by a subscriber unit in locating its control channel in accordance with the present invention.

FIG. 4 depicts the exemplary time/frequency diagram 300 overlaid with two of the six possible paths which could be taken by a transceiver 122 having an address equal to 5 in locating its control channel in accordance with the present invention. A transceiver 122 will find its control channel in zero, one, or two steps, depending upon the starting frequency as determined by the transceiver's scan list. The ultimate control channel choice is independent of the scan frequency used by the transceiver 122. Note that the path 402, starting on the frequency fd arrives on the target control channel frequency (ff) in one step. The path 404, starting on the frequency fa arrives on the target control channel frequency (ff) in two steps.

The alternating SCI method advantageously is robust. The control channel choice is the same if a transceiver 122 has more than one scan list frequency. Also the SCI frames can safely be used for messages (to transceivers 122 that live on the same control channel as the SCI frame).

Figure 5:
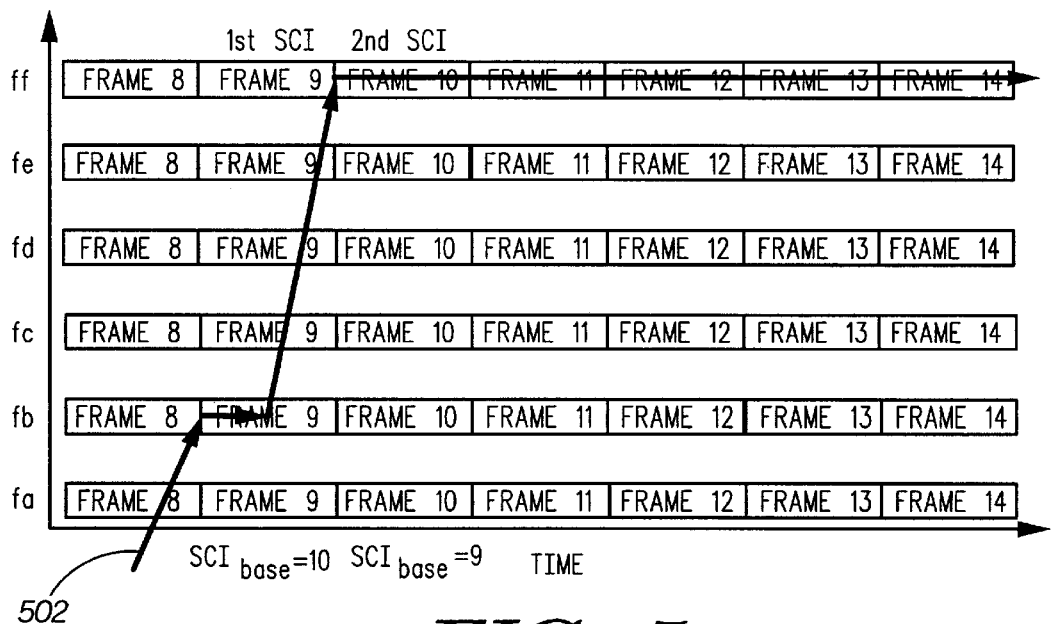
FIG. 5 is an exemplary timing diagram depicting closely spaced SCI frames in accordance with the present invention.

When SCI frames are alternated in odd and even FLEX cycles, it can take a transceiver 122 up to 8 minutes to find its channel. By placing the first and second SCI frames sufficiently close to each other it is possible to achieve a desired selection time. Scan latency can be minimized, for example, by putting the alternating SCIs in consecutive frames, as depicted in FIG. 5. The path 502 indicates how a transceiver 122 can quickly find its target control channel. Of course, the base frame information is temporarily changed in the first SCI frame (Frame 9 in the example), so that the transceivers 122 will "wake up" to receive the next consecutive SCI frame (Frame 10). Then the base frame information is restored to its original value in the second SCI frame. The Alternating SCI method can coordinate a large number of control frames. However, the method requires a large amount of processing power in the controller 112, because of the complexity of the configuration. Therefore, when less than twenty channels are needed in a subzone, the Private Data Channels method is preferred.

The Private Data Channels method in accordance with the present invention can boost the number of channels in a subzone to 20. In the traditional way, each control channel points to all of the available channels. What is new is that different control channels point to data-only channels that occupy different sets of frequencies.

The Private Data Channels method uses a static SCI configuration. The control channels are configured in the standard fashion. Transceivers 122 find their control channel in the conventional way that is fast (zero or one step) and robust (insensitive to extra scan list frequencies). To increase the number of coordinated channels, each control channel publishes a preferably different set of data-only frequencies.

Figure 6:
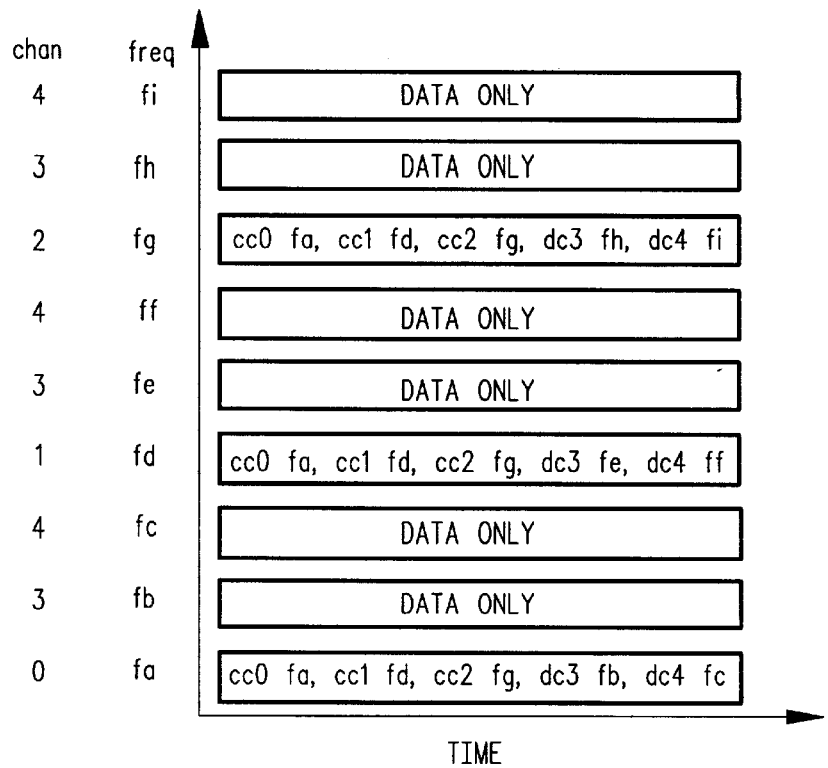
FIG. 6 is an exemplary diagram depicting a technique for identifying private data channels in accordance with the present invention.

For example, FIG. 6 shows a system with 3 control channels that each publish 2 data channels. The total number of channels is 9. Three of those channels are common among the control channels and can be used for load balancing. The maximum number of channels that can be obtained for each number of control channels in a FLEX system is given in the table below. It can be seen that the maximum number of channels is 20. The control channels can carry message loads for any other control channel. Hence load sharing is better with a high control channel ratio. Battery life is expected to be better too.

TABLE

Maximum number of FLEX channels per subzone

| NUMBER OF CONTROL CHANNELS | MAX DATA CHANNELS PER CONTROL CHAN | MAXIMUM CHANNELS | LOAD SHARING |
|---|---|---|---|
| 1 | 7 | 8 | 12% |
| 2 | 6 | 14 | 14% |
| 3 | 5 | 18 | 16% |
| 4 | 4 | 20 | 20% |
| 5 | 3 | 20 | 25% |
| 6 | 2 | 18 | 33% |
| 7 | 1 | 14 | 50% |
| 8 | 0 | 8 | 100% |

The capacity of a system can be boosted further by re-using three sets of 20 frequencies in small subzones, for a total of sixty channels. The number of channels also can be adjusted in each subzone to accommodate the local load. This reduces the amount of hardware needed to support a given message load.

To maximize load sharing, it is best to use a maximum possible number of control channels consistent with a desired total number of channels. Load sharing can further be improved by sharing some of the data channels. For example, an excellent way to provide 14 channels is to use 7 control channels, each one pointing to those 7 control channels plus one private data channel (7 control channels+ 7×1 private data channels=14 channels). The load sharing is 50% (see table above). An excellent way to provide 13 channels is to use the same 7 control channels, each one pointing to those seven channels, 5 pointing to a private data channel and 2 pointing to a shared data channel (7 control channels+5×1 private data channels+1 shared data channel= 13 channels). The load sharing is 8/13=61%.

Alternating SCIs can be combined with Private Data Channels and performed concurrently in a subzone of the wireless communication system. For example, one can create 15 control channels by alternating 5 and 3 control channel sets. Each of the 15 control channels can then point to 3 Private Data Channels for a total of 60 channels in a single subzone. Load sharing would be 25%. Different subzones can (re)use different sets of 60 channels. It will also be appreciated that hierarchical alternation of channels can be performed to achieve large numbers of control channel frequencies. For example, 8 control channel sets can be alternated with 7 control channel sets, which are themselves alternated with 5 control channel sets, which are then alternated with 3 control channel sets, to obtain 840 load-balanced control channel frequencies.

Figure 7:
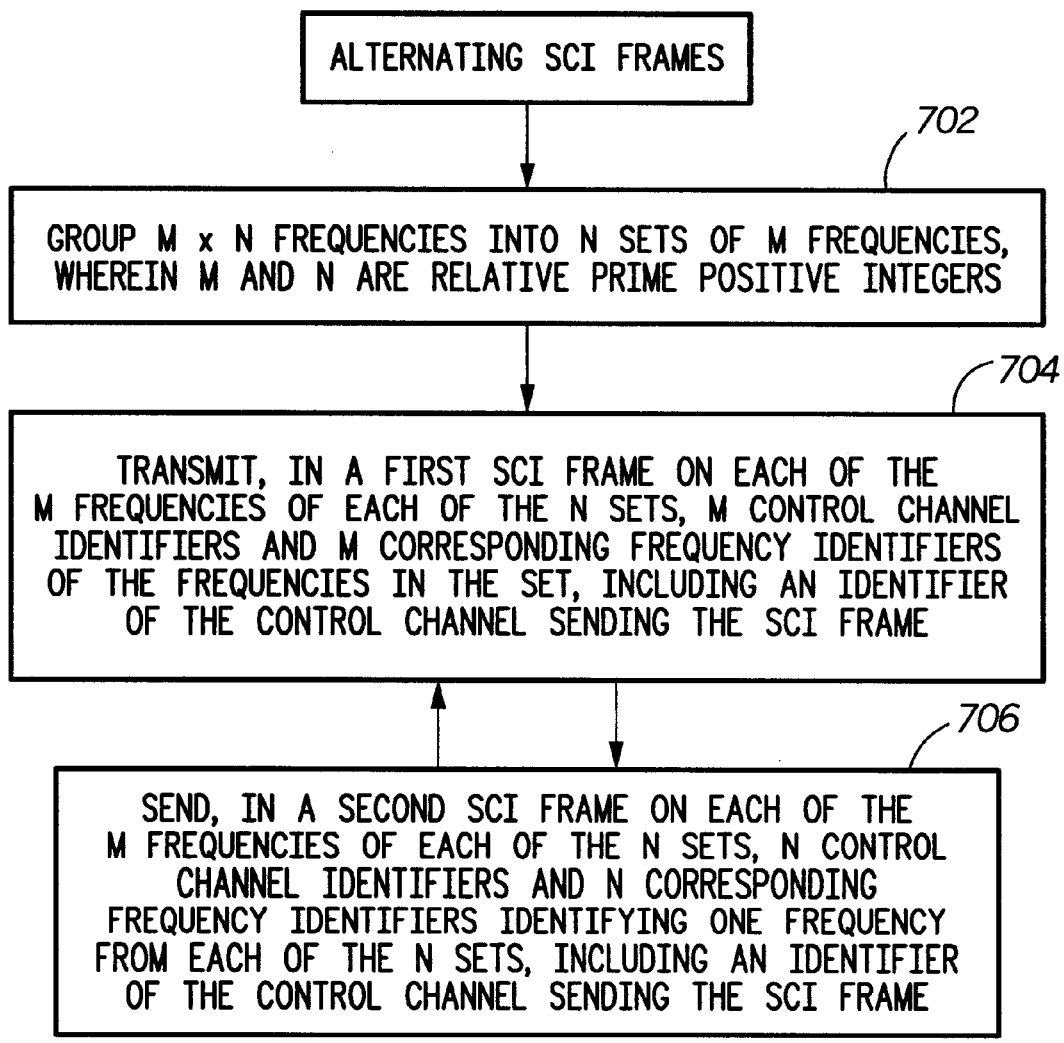
FIG. 7 is a flow diagram depicting operation of the exemplary controller in accordance with a first embodiment of the present invention.

FIG. 7 is a flow diagram 700 depicting operation of the exemplary controller 112 in accordance with a first embodiment of the present invention. More specifically, the diagram 700 depicts the alternating SCI frames method. In step 702, the processing system 210 accesses the alternator 224 to group M×N frequencies into N sets of M frequencies, wherein M and N are relative prime positive integers, e.g., M=8 and N=7. In step 704, the processing system 210 controls the base station 116 to transmit, in a first SCI frame on each of the M frequencies of each of the N sets, M control channel identifiers and M corresponding frequency identifiers of the frequencies in the set, preferably including an identifier of the control channel sending the SCI frame. In step 706 the processing system 210 controls the base station 116 to send, in a second SCI frame on each of the M frequencies of each of the N sets, N control channel identifiers and N corresponding frequency identifiers identifying one frequency from each of the N sets, preferably including an identifier of the control channel sending the SCI frame. It will be appreciated that the order of steps 704 and 706 does not matter—step 704 first, followed by 706; and step 706 first, followed by 704 will produce the same control channel assignment for a given transceiver address. Thus, the expressions "first SCI frame" and "second SCI frame" as used herein are not intended to imply order, but merely to indicate that two different SCI frames are used for the two transmissions.

Figure 8:
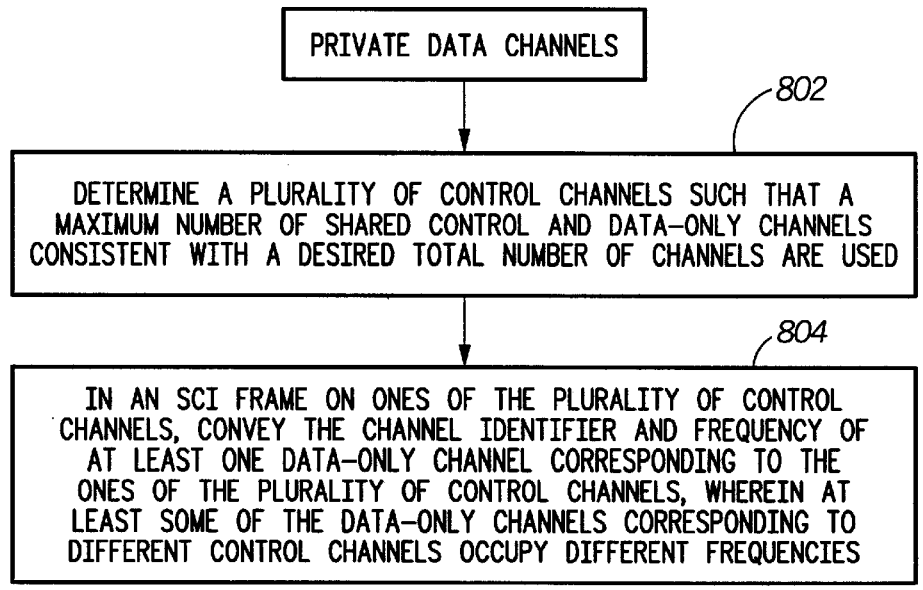
FIG. 8 is a flow diagram depicting operation of the exemplary controller in accordance with a second embodiment of the present invention.

FIG. 8 is a flow diagram 800 depicting operation of the exemplary controller in accordance with a second embodiment of the present invention. More specifically, the diagram 800 depicts the private channels method. First the processing system 210 accesses the identifier 226 to determine 802 a plurality of control channels such that a maximum number of shared control and data-only channels consistent with a desired total number of channels are used. This preferably is accomplished by referencing a table such as the table herein above. If, for example, 14 total channels are needed, this can be done with either two or seven control channels. Seven control channels are preferred, because load sharing will be 50% instead of only 14%.

Next, in an SCI frame on ones of the plurality of control channels, the processing system 210 conveys, i.e., controls the base station 116 to transmit, 804 the channel identifier and frequency of at least one data-only channel corresponding to the ones of the plurality of control channels, wherein at least some (preferably all) of the data-only channels corresponding to different control channels occupy different frequencies.

Thus, it should be clear from the preceding disclosure that the present invention advantageously provides a method and apparatus for enabling an identification of more than the maximum number of channel frequencies per subzone possible in prior art systems. Advantageously, the method and apparatus is backward compatible without requiring any changes in subscriber transceivers already operating in the wireless communication systems.

Many modifications and variations of the present invention are possible in light of the above teachings. Thus, it is to be understood that, within the scope of the appended claims, the invention can be practiced other than as specifically described herein above.

What is claimed is:

1. A method in a wireless communication system that transmits a system configuration information (SCI) frame on a control channel to identify up to a maximum number of channel frequencies employed within a subzone of the wireless communication system, the method for enabling an identification of more than said maximum number of channel frequencies in the subzone, comprising at least one of the steps of:

(a) alternating first and second SCI frames in the subzone, including:
    transmitting, in the first SCI frame, on a plurality of frequencies, a first predetermined number of control channel identifiers and corresponding frequency identifiers;
    sending, in the second SCI frame, on the plurality of frequencies, a second predetermined number of control channel identifiers and corresponding frequency identifiers, the first and second predetermined numbers different from one another; and
    repeating the transmitting and sending steps alternately; and (b) identifying private data channels, including
conveying, in the subzone in an SCI frame on ones of a plurality of control channels, a channel identifier and frequency of at least one data-only channel corresponding to the ones of the plurality of control channels, wherein at least some data-only channels corresponding to different control channels occupy different frequencies.

2. The method of claim 1,
wherein the alternating step comprises the step of grouping M×N frequencies into N sets of M frequencies, wherein M and N are integers greater than unity, and
wherein the transmitting step comprises the step of transmitting on each of the M frequencies of each of the N sets, M control channel identifiers and M corresponding frequency identifiers of the frequencies in the set.

3. The method of claim 1,
wherein the alternating step comprises the step of grouping M×N frequencies into N sets of M frequencies, wherein M and N are integers greater than unity, and
wherein the sending step comprises the step of sending on each of the M frequencies of each of the N sets, a transmission including N control channel identifiers and N corresponding frequency identifiers identifying one frequency from each of the N sets.

4. The method of claim 1,
wherein the alternating step comprises the step of grouping M×N frequencies into N sets of M frequencies, wherein M and N are integers greater than unity, and
wherein the transmitting step comprises the step of transmitting on each of the M frequencies of each of the N sets, a transmission including N control channel identifiers and N corresponding frequency identifiers identifying one frequency from each of the N sets.

5. The method of claim 1,
wherein the alternating step comprises the step of grouping M×N frequencies into N sets of M frequencies, wherein M and N are integers greater than unity, and
wherein the sending step comprises the step of sending on each of the M frequencies of each of the N sets, M control channel identifiers and M corresponding frequency identifiers of the frequencies in the set.

6. The method of claim 1, wherein the alternating step comprises the step of including in at least one of the first and second predetermined numbers of control channel identifiers and corresponding frequency identifiers an identifier of the control channel sending the SCI frame.

7. The method of claim 1,
wherein the alternating step comprises the step of grouping M×N frequencies into N sets of M frequencies, and
wherein M and N are relative prime positive integers.

8. The method of claim 1, wherein the alternating step further includes the step of placing the first and second SCI frames sufficiently close to each other to achieve a desired selection time.

9. The method of claim 1, wherein the step of identifying private data channels further includes the step of using a maximum possible number of shared control and data-only channels consistent with a desired total number of channels.

10. The method of claim 1, wherein both steps (a) and (b) are performed concurrently in the subzone of the wireless communication system.

11. A controller in a wireless communication system that transmits a system configuration information (SCI) frame on a control channel to identify up to a maximum number of channels employed within a subzone of the wireless communication system, the controller for enabling an identification of more than said maximum number of channels in the subzone, comprising:

a network interface for receiving messages;

a processing system coupled to the network interface for processing the messages; and a base station interface coupled to the processing system for controlling a base station to send the messages, wherein the processing system is programmed to do at least one of:

(a) alternating first and second SCI frames in the subzone, including:
transmitting, in the first SCI frame, on a plurality of frequencies, a first predetermined number of control channel identifiers and corresponding frequency identifiers;
sending, in the second SCI frame, on the plurality of frequencies, a second predetermined number of control channel identifiers and corresponding frequency identifiers, the first and second predetermined numbers different from one another; and
repeating the transmitting and sending steps alternately; and (b) identifying private data channels, including
conveying, in the subzone in an SCI frame on ones of a plurality of control channels, a channel identifier and frequency of at least one data-only channel corresponding to the ones of the plurality of control channels, wherein at least some data-only channels corresponding to different control channels occupy different frequencies.

12. The controller of claim 11, wherein the processing system is further programmed to:
group M×N frequencies into N sets of M frequencies, wherein M and N are integers greater than unity, and
control the base station to transmit on each of the M frequencies of each of the N sets, M control channel identifiers and M corresponding frequency identifiers of the frequencies in the set.

13. The controller of claim 11, wherein the processing system is further programmed to:
group M×N frequencies into N sets of M frequencies, wherein M and N are integers greater than unity, and
control the base station to send on each of the M frequencies of each of the N sets, a transmission including N control channel identifiers and N corresponding frequency identifiers identifying one frequency from each of the N sets.

14. The controller of claim 11, wherein the processing system is further programmed to:
group M×N frequencies into N sets of M frequencies, wherein M and N are integers greater than unity, and
control the base station to transmit on each of the M frequencies of each of the N sets, a transmission including N control channel identifiers and N corresponding frequency identifiers identifying one frequency from each of the N sets.

15. The controller of claim 11, wherein the processing system is further programmed to:
group M×N frequencies into N sets of M frequencies, wherein M and N are integers greater than unity, and
control the base station to send on each of the M frequencies of each of the N sets, M control channel identifiers and M corresponding frequency identifiers of the frequencies in the set.

16. The controller of claim 11, wherein the processing system is further programmed to include in at least one of the first and second predetermined numbers of control channel identifiers and corresponding frequency identifiers an identifier of the control channel sending the SCI frame.

17. The controller of claim 11, wherein the processing system is further programmed to group M×N frequencies into N sets of M frequencies, M and N being relative prime positive integers.

18. The controller of claim 11, wherein the processing system is further programmed to place the first and second SCI frames sufficiently close to each other to achieve a desired selection time.

19. The controller of claim 11, wherein, when identifying private data channels, the processing system is further programmed to use a maximum possible number of shared control and data-only channels consistent with a desired total number of channels.

20. The controller of claim 11, wherein the processing system is further programmed both to alternate first and second SCI frames and to identify private data channels concurrently in the subzone of the wireless communication system.

\* \* \* \* \*